United States Patent [19]

Lieber

[11] Patent Number: 4,950,437
[45] Date of Patent: Aug. 21, 1990

[54] MOLDING PROCESS FOR MUSICAL INSTRUMENT NECK

[76] Inventor: Thomas G. Lieber, 242 E. Argyle St., Valley Stream, N.Y. 11580

[21] Appl. No.: 51,412

[22] Filed: May 19, 1987

[51] Int. Cl.⁵ .................. B29C 43/18; B29C 67/14
[52] U.S. Cl. .................. 264/257; 264/258; 264/277; 264/313; 84/293; 84/452 P; 156/191; 156/245
[58] Field of Search ............... 264/258, 317, 313, 259; 156/191, 245; 84/293, 267, 374, 452 P, 452 R

[56] References Cited

U.S. PATENT DOCUMENTS

| | | | |
|---|---|---|---|
| 3,270,111 | 8/1966 | Haldemann | 264/258 |
| 3,474,697 | 10/1969 | Kaman | 84/267 |
| 3,805,663 | 4/1974 | Okugawa | 84/293 |
| 4,031,181 | 6/1977 | Schaefer et al. | 264/258 |
| 4,084,476 | 4/1978 | Rickard | 84/293 |
| 4,145,948 | 3/1979 | Turner | 84/452 P |
| 4,183,776 | 1/1980 | Staub | 156/191 |
| 4,313,362 | 2/1982 | Lieber | 84/293 |
| 4,560,523 | 12/1985 | Plumley et al. | 264/102 |
| 4,581,190 | 4/1986 | Nagamoto | 264/317 |

Primary Examiner—James Lowe
Assistant Examiner—Jeremiah F. Durkin, II

[57] ABSTRACT

A strip of fiber-reinforced plastic composite is wrapped around a neck and peghead insert positioned right-side up in a neck mold. A pressure plate having a fingerboard secured thereto is then lowered onto the mold and pressure applied to integrally mold the instrument neck with the fingerboard bonded thereto.

2 Claims, 1 Drawing Sheet

MOLDING PROCESS FOR MUSICAL INSTRUMENT NECK

BACKGROUND OF THE INVENTION

This invention relates generally to the integral molding of a musical instrument neck during which a fingerboard is bonded to the neck, and, more specifically, to the integral molding of guitar necks using a fiber-reinforced plastic composite strip wrapped around a neck insert and bonded to a fingerboard during a single molding operation.

Musical instrument necks have traditionally been formed of wood, with a fingerboard bonded thereto after fabrication of the neck. More recently, an increasing number of musical instrument necks, especially those of guitars, have been constructed of plastic, reinforced by metal bars or fiber/plastic composites. A typical example of a fiber-reinforced plastic neck is disclosed in U.S. Pat. Nos. 4,313,362 (Lieber) and 4,145,948 (Turner). Most fabrication techniques do not encompass integral molding of the neck, together with bonding of the fingerboard and the peghead, being that a simple and yet reliable process for doing so has been lacking.

Conventional molding processes used in the construction of plastic guitars continue, in large part, to follow the same fabrication used in making wood guitars; i.e., the fingerboard is bonded to a completed plastic neck following the molding process. In a typical construction of a fiber-reinforced plastic composite guitar neck, for example, the neck is separately formed and cured, and a bridging point is laminated to the unfinished, upper surface of the cured neck, following which the fingerboard is laminated to the bridging strip and cured to yield the completed neck.

The molding process of this invention allows the one-piece, one-step construction of a composite musical instrument neck with fingerboard as well as peghead bonded thereto in a single operation. The relative ease of employing such process makes possible lower cost fabrication of musical instrument necks, as well as fabrication of such necks on an automated basis.

SUMMARY OF THE INVENTION

In accordance with this invention there is provided a process for the integral molding of a stringed instrument neck with fingerboard bonded thereto, wherein a strip of a synthetic structural material, such as fiber-reinforced plastic composite, is wrapped around a neck insert or plug and the resulting combination is placed right-side up in a neck mold and pressed against a pressure plate having secured thereto a finger-board, such that the strip is molded into the shape of the instrument neck and at the same time the fingerboard is bonded to the molded neck. Preferably, a preshaped peghead form or caul is placed in the neck mold during the molding operation such that the peghead of the instrument can be integrally molded with the neck using the same strip of synthetic material employed in forming the neck itself.

It is a primary objective of this invention to provide a molding process permitting the integral molding of the neck and peghead of a stringed musical instrument together with bonding of a fingerboard thereto in a simple and yet reliable one-step operation.

It is another objective of this invention to provide a molding operation for the construction of a stringed musical instrument neck adaptable for use in automated assembly lines.

It is another objective of this invention to provide a molding process for the automated assembly of acoustic or electric guitar necks formed of fiber-reinforced plastic composites.

DESCRIPTION OF THE PREFERRED EMBODIMENT

Figure 2:
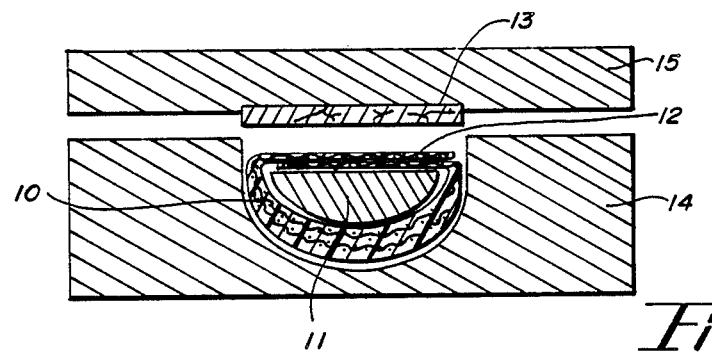
FIG. 2 is a cross-sectional view of the neck mold with the wrapped neck insert and pressure plate in position for molding.

Referring more specifically to the drawings, as shown in FIG. 2, a strip 10 of fiber-reinforced plastic composite, such as a composite of Boron fibers impregnated with an epoxy resin, is wrapped around the neck insert 11 as shown, with an overlap of the strip on the top upper surface 12 of the insert, to which the fingerboard 13 is to be bonded. The reinforced strip can be formed of any synthetic fiber composite, or reinforced, structural material in general. Preferably, the strip 10 is formed of multiple layers of cloth fibers impregnated with a resinous material, such as an epoxy resin, making up a thickness of from 1/16 to 3/16 inches.

The wrapped neck insert 11 is positioned right-side up in the neck mold 14, and the pressure plate 15, bearing the fingerboard 13, is pressed down against the overlapped layers of the composite strip 10. The fingerboard 13 can be held in a grooved channel of the pressure plate 15, the groove having the same dimensions as the fingerboard in length and width, and held in place during the insertion into the neck mold by means of a pin system or contact cement. The pressure plate 15 and the neck mold 14 are preferably made of a machined metal, such as aluminum or steel, although less expensive tooling, such as that using high temperature epoxy with fiber carbon or fiberglass, would also be acceptable. The neck insert 11 can be removed after completion of the molding process, leaving a hollow instrument neck.

Figure 1:
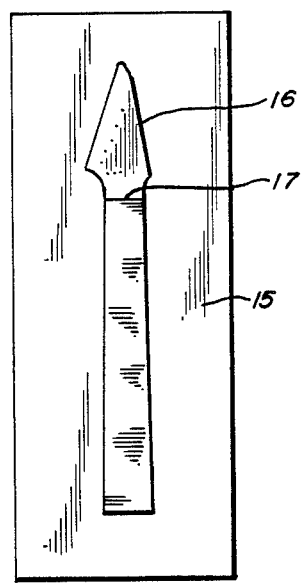
FIG. 1 is a bottom view of the pressure plate.
Figure 1A:
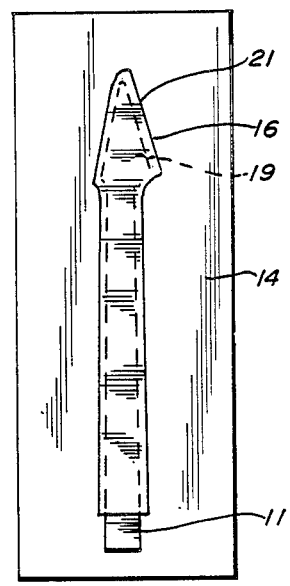
Fig. 1A is a plan view of the neck mold.

As shown in FIG. 1, pressure plate 15 has permanently secured thereto a pre-shaped peghead form or caul 16, having lower boundary designated by line 17. Caul 16 is adapted to fit over the peghead portion 21 of the neck mold 14 during the molding operation, such that the peghead can be integrally molded with the neck. A separate peghead insert 19, formed of wood, plastic, foam, etc. is placed in the peghead portion 21 of the neck mold as shown in Fig. 1A, and wrapped with the composite strip 10 in the same manner as the neck insert 11 is wrapped. Peghead insert 19 becomes a permanent part of the instrument peghead as a result of the molding operation.

Conventional molding pressures, temperatures and times are used in forming instrument necks in accordance with the process of this invention. For example, temperatures can range from 250 to 350 degrees Farenheit, with pressures from 50 to 100 lbs. per square inch. Cure time can be 90 minutes at 250 degrees, or 60 minutes at 350 degrees.

Figure 3:
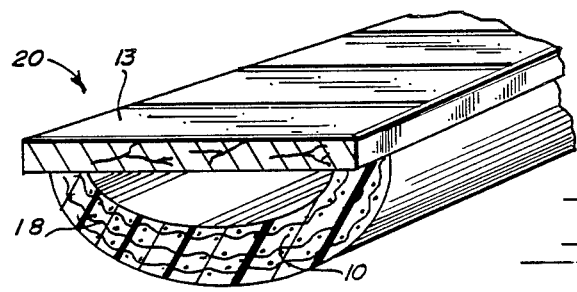
FIG. 3 is a fragmentary perspective view of the completed neck.

FIG. 3 shows a completed instrument neck 20 with fingerboard 13 securely bonded to neck portion 18 formed by molding of strip 10 as described above and shown in FIG. 2. Not shown is the peghead of the instrument, which is formed at the same time and in the same manner as the neck portion 18, except that caul 16 and peghead insert 19 are employed, as also described above.

The molding process of this invention permits the molding of the neck and peghead using the same resins employed in impregnating the cloth fibers making up the reinforced structural material of the neck itself, and further avoids a separate lamination step otherwise required to attaching the fingerboard to the neck. The specific wrap-around technique of this invention, whereby the composite strip is wrapped around the neck insert and then back across the upper surface of the neck insert, using the molding apparatus as described, provides an especially preferred method of integrally molding fingerboards to the necks of a wide variety of musical instruments. The molding process has proven to be especially valuable in the construction of fiber-reinforced plastic composite necks for electric guitars.

It is claimed:

1. A process for the integral molding of a stringed musical instrument neck and fingerboard comprising:
   wrapping a strip of fiber-reinforced plastic composite around a neck insert in a neck mold having a substantially U-shaped cavity, the U-shaped cavity having sufficient width to receive therein the fingerboard across its width, the fingerboard so received being in accurate alignment with the neck insert, and the amount of plastic composite being sufficient to form under pressure a bonding surface above the neck insert for the fingerboard,
   placing over the U-shaped cavity of the neck mold a pressure plate releasably bearing the fingerboard right-side-up on its undersurface, and
   pressing the pressure plate against the neck mold with the fingerboard inside the U-shaped cavity thereof, such that the fingerboard is bonded to the upper surface of the strip of plastic composite with the accuracy of alignment required of an instrument having musical properties.

2. The process of claim 1, wherein the neck mold has a peghead portion and is provided with a peghead insert and the strip of reinforced structural material extends into such peghead portion to permit integral molding of the peghead with the neck.

* * * * *